UNITED STATES PATENT OFFICE.

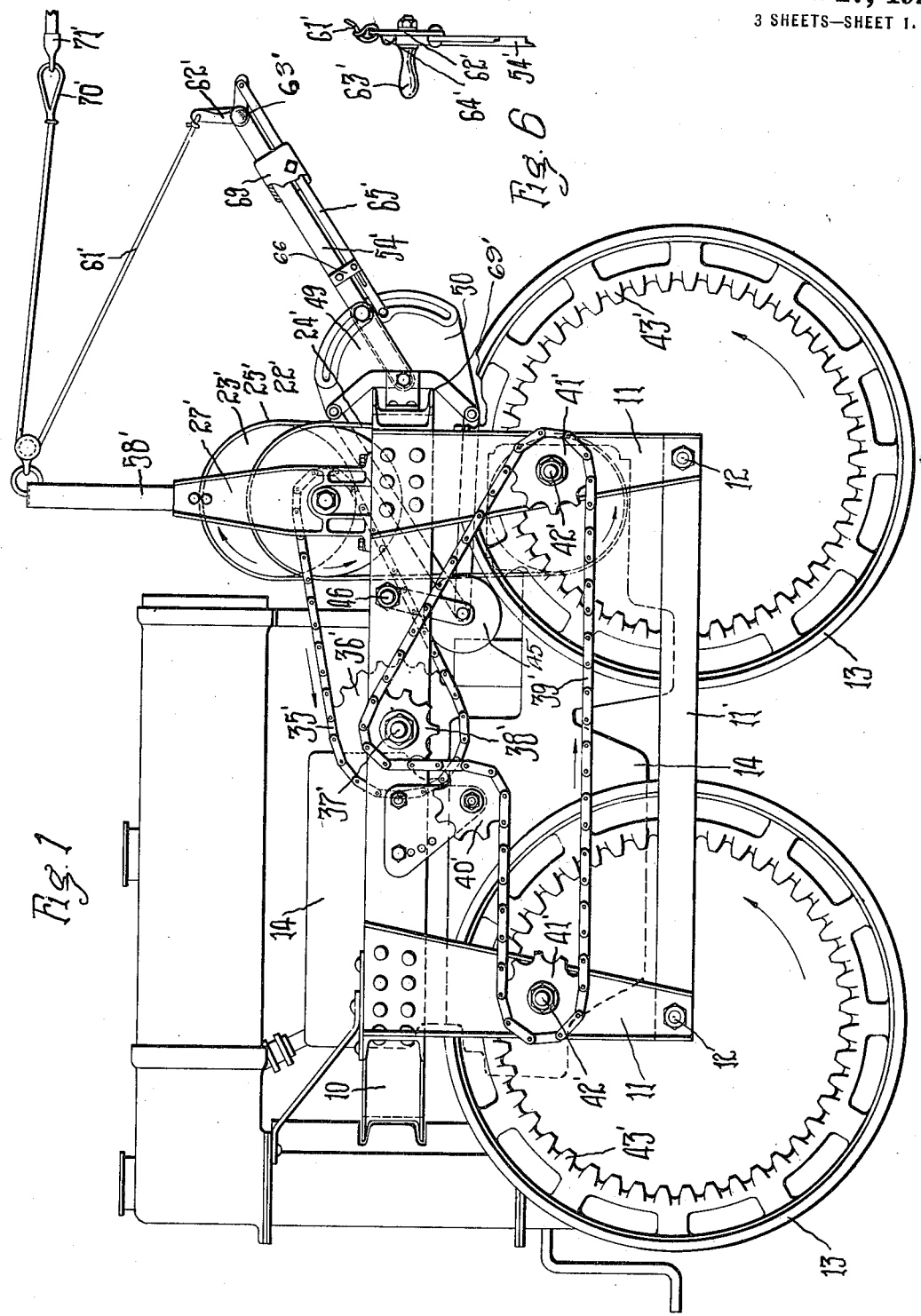

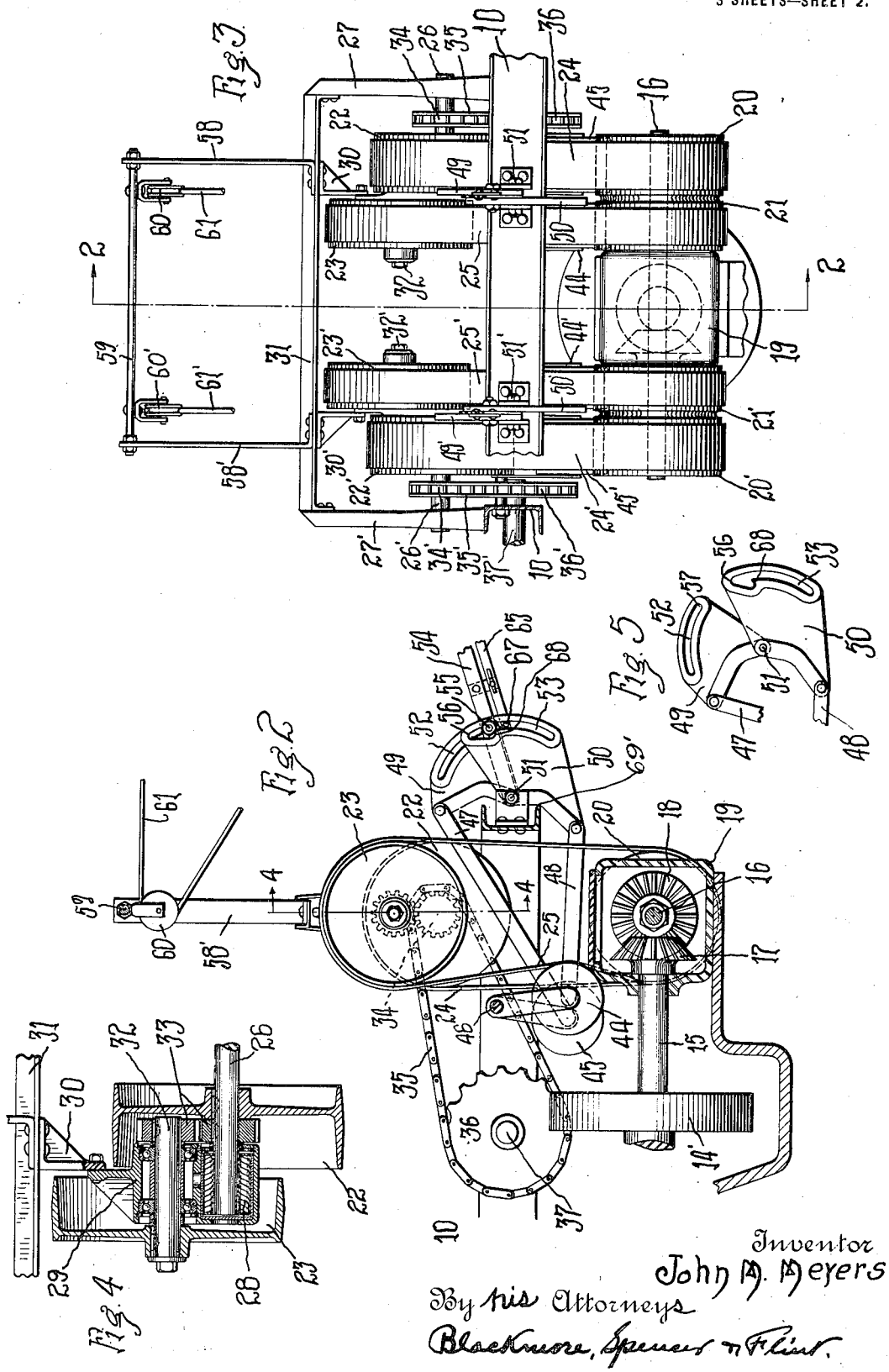

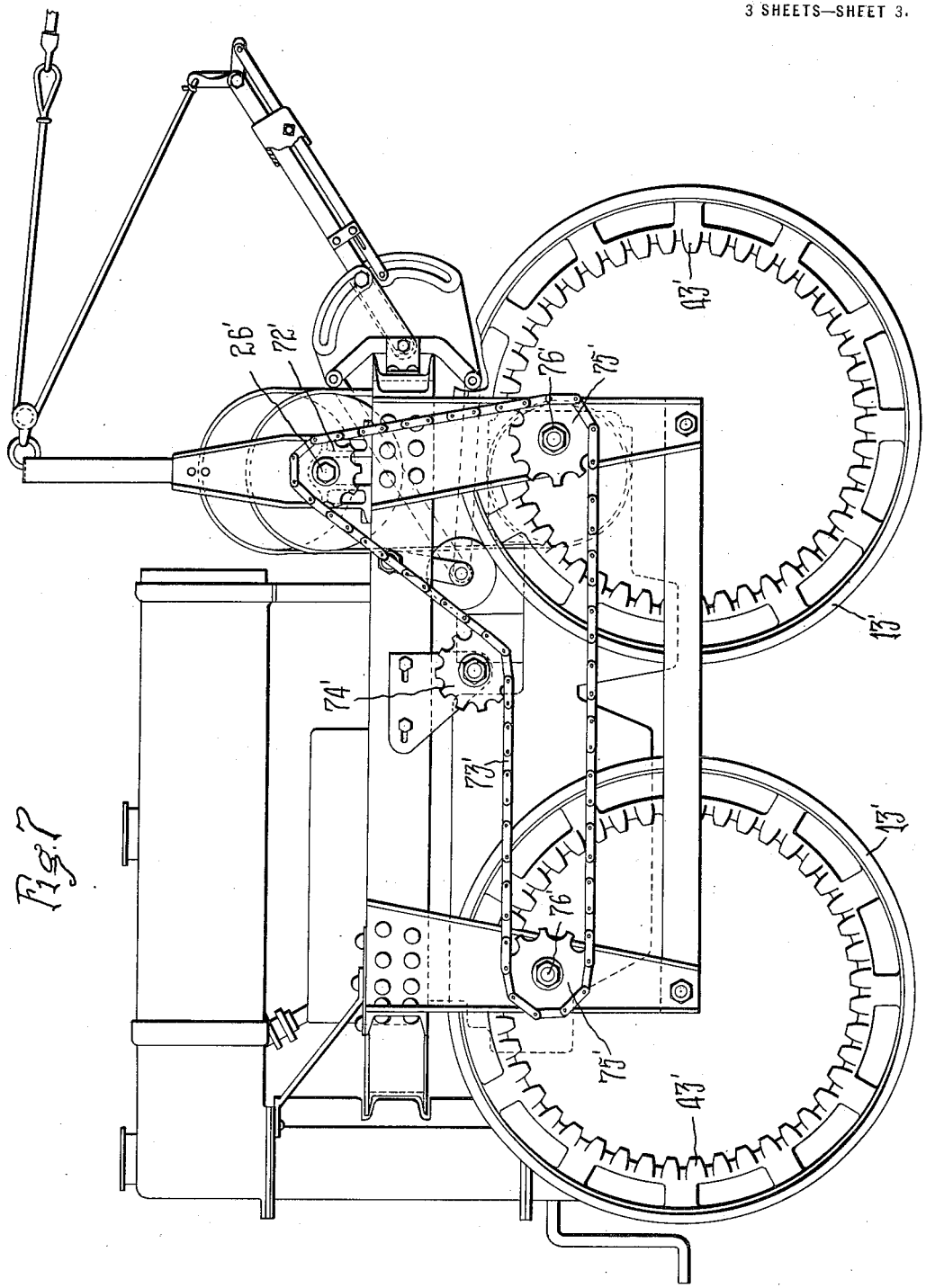

JOHN M. MEYERS, OF JANESVILLE, WISCONSIN.

FARM-TRACTOR.

1,401,629. Specification of Letters Patent. Patented Dec. 27, 1921.

Application filed November 14, 1919. Serial No. 337,947.

*To all whom it may concern:*

Be it known that I, JOHN M. MEYERS, a citizen of the United States, and a resident of Janesville, county of Rock, and State of Wisconsin, have invented certain new and useful Improvements in Farm-Tractors, of which the following is a full, clear, concise, and exact description, such as will enable others skilled in the art to which the invention relates to make and use the same, reference being made therein to the accompanying drawings, which form a part of this specification.

My invention relates to tractors operated by suitable internal combustion or other engines and designed for general agricultural purposes, and particularly to tractors of the kind or type designed to draw agricultural implements of various kinds or types; the tractor being capable of and adapted for use with ordinary kinds or types of agricultural implements for hauling the same, and in fact for general hauling purposes.

The object of my invention is to provide a farm tractor of the general type or class and having the characteristics above referred to which will be simple in construction and cheap to manufacture, which may be more readily manipulated, and turned about at a sharper angle, or within a shorter space, than has heretofore commonly been the case; and in general to provide a tractor which will be better adapted for the general run of farm work than has heretofore ordinarily been the case in prior tractors.

A further objects of my invention is to provide an improved farm tractor in which four driving wheels are employed, the two driving wheels upon each side of the tractor being driven independently of those on the other side thereof, and either in a forward or in a reverse direction, to thereby provide for a more complete control of the tractor, the reversing thereof, and the turning of the same about within a limited space.

A further object of my invention is to provide various improvements in and relating to tractors of the general type known as line drive tractors wherein the operator may be seated upon a farm implement being drawn by the tractor, his position thus being in the rear of the tractor; and in which the tractor itself is controlled as to the starting and stopping thereof, as well also as to its direction of travel, by means of flexible members or lines grasped by the operator and extending to and connected with the controlling mechanism thereof.

A further object of my invention is to provide certain improvements in and relating to a tractor of the belt drive type or class, and wherein motion is transmitted from the driving member of the tractor through a plurality of belts adapted to drive the same in either a forward or in a reverse direction.

With the above and other objects of invention in view, my invention consists in the improved farm tractor illustrated in the accompanied drawings and hereinafter described and claimed; and in such variations and modifications thereof, within the scope of the concluding claims, as will be obvious to those skilled in the art of which my invention relates.

Referring now to the drawings wherein the preferred embodiment of my invention is illustrated;

Figure 1 is a view showing my improved tractor in side elevation.

Fig. 2 is a fragmentary view, for the most part in side elevation, and in which the particular construction and arrangement of the driving and reverse mechanism employed therein is shown.

Fig. 3 is a view showing the driving and reversing mechanism in elevation, and as seen from a position to the right of Fig. 1.

Fig. 4 is a view showing a section on a vertical plane indicated by the line 4—4, Fig. 2.

Fig. 5 is a view showing certain parts of the belt tightener operating mechanism employed in and forming a part of the driving mechanism of the tractor.

Fig. 6 is a view showing certain details of one of the controlling levers present in my improved tractor.

Fig. 7 is a view showing a side elevation of my improved tractor, and in which the driving mechanism is modified in certain respects.

Referring now to the drawings, the reference numeral 10 designates a suitable supporting frame whereby and from which the operating elements of the tractor are supported; said frame-work having depending legs 11 the lower ends of which are provided with bearings within which supporting shafts 12 are rotatable, and which supporting shafts serve to support the main driving wheels 13 of the tractor. Two such driving wheels are provided upon each side of the tractor, although only one pair is shown in Fig. 1, and depending wheel supports such as the legs 11 are located just inside as well as just outside of each of the driving wheels; so that the two wheels upon each side of the tractor are supported from the side portions of the frame beneath which they are located, thus providing a tractor in which the central portion of the frame is open upon the under side, and in which abundant head room is provided so that the tractor can be driven along rows of standing corn or other crop to be cultivated without breaking down the same. The lower ends of the legs are connected together by suitable tie bars 11′.

The driving engine 14 of the tractor is supported in a central position and is disposed for the most part beneath the frame 10, but is spaced apart from the driving wheels so that the tractor may travel along rows of growing crop. This engine is provided with the usual fly-wheel 14′ preferably inclosed within an extension of the crank case thereof, and 15 designates an extension of the crank shaft of the engine; which last mentioned shaft serves to drive a second shaft 16 through suitable bevel gears 17, 18; the shaft 16 extending transverse to the tractor as best shown in Figs. 2 and 3, and the same being supported in any suitable bearings which in turn are supported from the main frame of the tractor. The bevel gears 17, 18 are shown as located within a gear housing 19 which serves to protect the same and prevent access of dirt thereto, as will be appreciated.

The shaft 16 carries two pairs of driving pulleys 20, 21 and 20′, 21′ whereby the pairs of driving wheels upon the opposite sides of the tractor are driven through suitable combined transmission, clutch, and reversing mechanisms, one associated with each pair of driving wheels, as will hereinafter appear. It will be appreciated, however, that a single pulley may be substituted for the two pulleys shown, the reference to two pulleys having to do more with the function performed than with the construction employed as it will be appreciated that the purpose of the construction referred to is to provide two driving surfaces or portions each adapted to drive one of the transmission mechanisms referred to through a separate driving belt. The pairs of driving pulleys 20, 21 and 20′, 21′ are located upon opposite sides of the gear housing 19, as best shown in Fig. 3 of the drawings, and the shaft 16 is obviously supported by any suitable bearings or supports.

The driving and reversing mechanism through which the two pairs of driving wheels upon opposite sides of the tractor are driven are identical one with the other, in view of which fact only one of said two driving mechanisms will be hereinafter described; the description hereinafter in fact relating to the driving mechanism upon the right hand side of the tractor as regarded from a position to the right of Fig. 1. It will be understood, however, that the two driving mechanisms are alike in all respects and that the operation of the two is the same in all essential particulars.

The driving pulleys 20, 21 operate to drive two driven pulleys 22, 23 through two driving belts 24, 25; which driving belts extend about the two pairs of pulleys, as clearly shown in Figs. 2 and 3, and are normally loose upon said pulleys so that neither of them are driven from the shaft 16 unless and until the driving belt associated with the pulley in question is tightened.

The driven pulley 22 is secured to and rotates with a driving shaft 26, one end of which is supported in a bearing carried by an upwardly extending bracket 27 the lower end of which bracket is secured to a cross-member of the frame 10, while the other end of said driving shaft is supported in a bearing 28 provided in a stationary bearing member 29 which is supported by a bracket 30 from a cross-bar 31 extending between the bracket 27 and the companion bracket 27′ upon the other side of the tractor, see Figs. 2 and 3, so that said bearing member 29 is held against rotation; and so that the inner free end of the driving shaft 26 will be firmly supported from the cross-bar 31 through the bearing member aforesaid. This bearing member is also provided with a second bearing within which a shaft 32 is rotatably supported, which last mentioned shaft serves as a support for the second driven pulley 23 above referred to, as best shown in Fig. 4 of the drawing. The shafts 26 and 32 are provided each with a gear both of which are designated by the reference numeral 33, the two gears being in mesh with one another in the form of my invention illustrated, from which it follows that the driving pulleys 22, 23 rotate in opposite directions, and that either one of them may be driven from the other through one or the other of the driving belts 24, 25 above referred to.

It therefore follows that if for example the driving belt 24 drives the pulley 22 in a direction to produce forward motion of the tractor, then the pulley 23 will be driven in a reverse direction, but will be ineffective as a driving element because the belt 25 upon it is loose. If on the other hand the belt 25 be made to drive the pulley 23, then the said pulley will drive the pulley 22 through the gears 33, and the tractor, or rather the wheels upon one side thereof, will be driven in a reverse direction from that in which they are driven through the pulley 22, the driving belt 24 being assumed to be loose and ineffective to drive the said last mentioned pulley.

The driving shaft 26 with which the pulley 22 is directly connected and which shaft may also be obviously driven from the pulley 23 is provided with a pinion 34 which acts to drive a sprocket chain 35, and the reference numeral 36 designates a second sprocket wheel about which the sprocket chain 35 passes to thereby drive the same. The sprocket wheel 36 is secured to a short shaft 37 for which bearings are provided in the frame 10 of the tractor, and to which shaft a sprocket wheel 38 is secured. This last mentioned sprocket wheel, or rather the corresponding sprocket wheel 38' shown in Fig. 1, acts to drive a sprocket chain 39' which passes about the idler sprocket 40'; and then about two other sprockets 41', 41' associated one with each of the main driving wheels upon the side of the tractor upon which the transmission mechanism here referred to is located, said sprocket wheels 41' being supported by shafts 42' rotatable in bearings carried by the outer of the depending legs 11 of the tractor frame; and these shafts 42' are provided at their inner ends with pinions, not shown, but which engage the teeth of internal annular gears 43', carried by the driving wheels, as shown in Fig. 1 of the drawings. All the elements here referred to and designated by numerals with primes are duplicated upon the right side of the tractor, as will be appreciated.

It will be appreciated from the above that the shaft 37 associated with each pair of driving wheels acts to drive said wheels through the sprocket 38, the sprocket chain 39, the sprocket wheels 41, the shafts 42, and the pinions upon the inner ends of said shafts which engage the internal gears 43; and that said shaft 37 is itself driven from the driving shaft 26 upon the same side of the tractor as that upon which the wheels in question are located through the driving pinion 34, the sprocket chain 35, and the sprocket wheel 36 which is carried by and fixedly secured to the said shaft.

As hereinbefore stated, the belts 24, 25 and 24', 25', one pair of belts being associated with each transmission mechanism and with each pair of side driving wheels as explained, are normally loose upon the pairs of driving and driven pulleys about which they pass; and suitable belt tightening means are provided for tightening one or the other of said belts, each independently of the other, to thereby secure the driving of the driving shafts 26 or 26' in either a forward or in a reverse direction, according to which driving belt is tightened and which is permitted to remain loose upon the pulley with which it coöperates. Thus as above explained the tightening of the belt 24 results in direct driving of the shaft 26 through the pulley 22, while the tightening of the belt 25 drives the said driving shaft in a reverse direction through the pulley 23 and the gears 33.

The belt tightening devices above referred to are shown as in the form of pulleys 44, 45 pivotally supported from a rod 46 which in turn is supported by a member of the frame 10 of the tractor, through and by means of suitable links, as best shown in Fig. 2; and said belt tightening pulleys are moved into engagement with the belts 24, 25 through operating mechanisms which operate through suitable links 47, 48 associated one with each of the belt tightening devices. The right hand ends of these links 47, 48 are connected with belt tightener operating members 49, 50, both of which are pivotally supported from the main frame 10 of the tractor at a pivotal point 51, see Fig. 2, and which operating members are provided with arcuate slots 52, 53 which are concentric with the pivotal point 51 at which the said oscillating members are supported; and a suitable lever 54 also pivotally supported so as to swing about the point 51 as a center is adapted to be operatively connected with one or the other of the oscillating operating members in question, to thereby operate either of said members and tighten the belt with which it is associated without, however, operating the other member or tightening the other belt.

The lever 54 is provided with a bolt or pin 55 which moves along and within both of the slots 52, 53 and which bolt as the lever moves comes to the end of one of the slots, after which the oscillating member having the slot in question is moved by the lever during the continued movement of the latter. Thus as the lever 54, referring to Fig. 2, is moved upward, the pin 55 will presently engage the upper end 56 of the slot 53; after which angular movement will be imparted to the oscillating belt tightener operating member 50 and the associated belt tightening pulley 44 will be moved into engagement with the belt 25 during the continued movement of the lever. If on the other hand the lever 54 is swung downward about the pivotal point 51, then the pin 55 will engage the lower end 57 of the slot 52, after which the belt tightener operating member 49 will be swung about the pivotal support 51, and the belt tightener 45 moved into engagement with the belt 24 through the link 47, thus tightening the belt as the lever in question is moved downward; and likewise for the corresponding elements of the transmission mechanism upon the left hand side of the tractor.

Fig. 1 of the drawings shows both belts loose, and the belt tightening mechanism as a whole in a central position; while Fig. 2 shows the parts in the position which they assume after the lever 54 starts to move downward to thereby bring about the tightening of the belt 24.

The lever 54 is held in a normal central position by means of a pin 67 carried by the end of a sliding bar 65, which pin normally engages and rests upon a shoulder or lug 68 provided in the slot 53 of the belt tightener operating member 50; the said member 50 being prevented from swinging downwardly by a suitable stop such, for example, as the stop at 69' provided by a portion of the frame 10 of the tractor.

Extending upward from the cross-bar 31 are two standards 58, 58', the upper ends of which are connected by a rod 59 which serves to support two pulleys 60, 60' in an elevated position; and 61, 61' are two flexible members or lines whereby and through which the levers 54, 54' associated with the two transmitting, driving and reversing mechanisms upon opposite sides of the tractor may be operated; to thereby effect the starting, stopping, and reversing of the driving wheels upon opposite sides of the tractor and which are controlled by the levers in question. These flexible controlling members extend about the pulleys 60, 60', and the free ends thereof are connected one with each of the two latch operating members 62, 62' pivotally supported one at the free end of each operating lever 54, 54', one only of which, however, is shown in Figs. 1 and 6, although it will be understood that said members are both alike.

The latch operating member 62 is located adjacent a handle 63 so that an operator upon grasping the handle may operate the said latch through a projection 64 thereupon to be pushed by the thumb; and one end of said latch is pivotally connected with the longitudinally movable locking bar or rod 65 which is guided by a suitable guide at 66, and the lower end of which carries the pin 67 which abuts against the stop 68 formed in the wall of the slot 53 of the oscillating belt tightener gear operating member 50. A suitable stop as above explained as indicated at 69' prevents downward movement of the member 50 from the position which it occupies when the belt tightener 44 with which it is connected is away from the belt 25, from which it follows that the engagement of the pin 67 with the projection or lug 68 will hold the lever 54 up and in the neutral central position in which it is shown. The bar 65 carries a weight 69 which fits loosely about the lever 54, see Fig. 1, and the action of which is obviously to force the bar downward and keep the pin 67 in engagement with the lug 68.

The belts 24, 24' which extend about the driven pulleys 22, 22' which are secured directly to the driving shafts 26, 26', are the belts which are ordinarily used in forward driving, and these belts are tightened by the belt tighteners 45, 45' which are operated from the oscillatory operating members 49, 49' through the links 47, 47'; from which it follows that as the lever 54 swings downward the bolt or pin 55 will engage the end 57 of the slot 52 and carry the oscillating member 49 along, thus operating the belt tightener 45 and tightening the belt 24 and securing driving of the tractor in a forward direction, the weight 69 holding the belt tightener in engagement with the belt during forward driving.

There is nothing to prevent upward movement of the lever 54, and an upward force applied thereto directly by the handle 63, or indirectly through the flexible member or line 61, will bring about the tightening of the reverse driving belt 25.

The stop 69' or its equivalent, the pin 67, and the lug 68 normally prevent downward movement of the lever 54. If, however, the rein 61 is given an easy pull, and is then immediately slightly released, the pin 67 will be moved out from engagement with the lug 68; whereupon the weight 69 will move the lever 54 down and, when the bolt or pin 55 comes into engagement with the end 57 of the slot 52 the oscillating belt tightener operating member 49 will be swung downward; thus moving the belt tightener 45 into engagement with the forward driving belt 24, and securing forward driving of the driving wheels; it being remembered that the driven pulleys 22 and 23, and 22' and 23', always rotate in opposite directions, and that the driving shafts 26, 26' may be driven by either of the driven pulleys 22, 23 of the transmission and reversing mechanism of which it forms a part.

It will be appreciated that the pin 67 and lug 68 may also be disengaged by grasping the handle 63 and operating the latch operating member 62 by the thumb, whereupon the lever 54 may be moved downward by direct force applied by the hand of the operator in addition to the force due to the weight 69.

The flexible member 61 has a loop or eye 70 from which a line 71 extends to the operator; and the length of the member 61 is such that there will be no appreciable slack therein when the lever 54 is in its central position, and the loop or eye 70 is passed or hooked over the handle 63. This provides a convenient safety member or lock as the driver, by hooking the loop over the handle when he has occasion to work about the tractor to oil, adjust, or otherwise put it in condition for operation, may be sure that the lever cannot move into a lower position, due to the action of the weight 69, should the pin 67 become accidentally disengaged from the lug 68, which action, should it occur, would obviously tighten the forward driving belt 24 and start the tractor.

In view of the premises it will be appreciated that the pairs of driving wheels upon each side of the tractor are driven each pair by a separate and distinct transmission, reversing, and clutch mechanism, which mechanisms are under the complete control of the operator and may be operated either by directly grasping the handles with which the controlling levers are provided or by pulling upon the flexible members or lines which are connected with said levers.

When the levers are in their neutral central positions neither of the transmission mechanisms will be operative, and the tractor will obviously remain at rest. The operator may, however, by operating either of the controlling levers either directly by hand or through a line so manipulate the transmission mechanisms as to secure forward driving of the driving wheels upon each side of the tractor; so as to secure forward driving of the driving wheels upon one side of the tractor while permitting the drive wheels upon the other side of the tractor to remain at rest, which happens when the lever associated with the pair of driving wheels in question is in its neutral central position; or so as to secure forward driving of the driving wheels upon one side of the tractor and rear driving of the driving wheels upon the other side of the tractor. This last mentioned capability or operation obviously provides a tractor which may be turned about within an exceedingly short space, or in its own tracks, as it were; and the transmission mechanisms regarded in their entirety obviously provide a tractor which is extremely flexible as to the control thereof, and which may be more readily maneuvered than has heretofore ordinarily been the case in farm tractors. It will of course be appreciated that the speed at which the driving wheels are driven may to some extent be regulated by permitting slipping of the belts through which they are driven, although ordinarily the speed will be regulated by controlling the engine speed as the slipping of the belts is not desirable if it can be avoided.

The steering of the tractor is obviously effected by permitting one or the other of the belts which are driving at a given time to slip, this being accomplished by loosening the proper belt tightener by a pull of the proper line; although by far the greater amount of work is done by the tractor when it is moving straight ahead, so that the necessity for purposely permitting one belt to slip will occur infrequently.

In the form of my invention shown in Fig. 7 the driving shafts 26, 26', instead of driving the driving wheels through sprocket chains 35 and sprocket wheels through which motion is communicated to a second sprocket chain 39; as in the form of my invention hereinbefore described, are provided with pinions 72, 72', one only of which is shown but which are present upon each side of the tractor; which pinions engage single sprocket chains 73, 73' one upon each side of the vehicle and which chains pass about idler sprockets 74, 74', and also about two sprocket pinions associated one with each of the driving wheels, and to which the numerals 75, 75' are applied. The pinions are secured to the ends of shafts 76, 76' which correspond with the shafts 42, 42' in the form of my invention first described, and the inner ends of said shafts are provided each with a pinion, not shown, but which is in driving engagement with the internal gears 43, 43' carried by the driving wheels. It therefore follows that in this form of my invention a single driving chain only is employed upon each side of the tractor, as distinguished from two driving chains and means through which motion is communicated from one of them to the other as in the form of my invention hereinbefore described.

Having thus described and explained my invention, I claim and desire to secure by Letters Patent:

1. In a tractor of the class described, a suitable frame; an engine supported by said frame; a shaft driven by said engine; two driving pulleys secured to said shaft and driven thereby; two driven pulleys; a driving shaft upon which one of said driven pulleys is fixedly secured; means whereby and through which said driven pulleys are operated one from and by the other and in opposite directions; a pair of normally loose belts extending about said pairs of driving and driven pulleys; two belt tightening devices one associated with each of said belts and whereby either belt may be tightened independently of the other; two operating members one operatively associated with each of said belt tightening devices; a single pivotally supported manually operable lever adapted to swing in one direction to operate one of said operating members, and to swing in the other direction to operate the other of said operating members; means whereby said lever may be operatively connected with either one of said operating members to thereby operate each independently of the other; a driving wheel; and means whereby said driving wheel is driven from said driving shaft.

2. In a tractor of the class described, a suitable frame; an engine supported by said frame; a shaft driven by said engine; two driving pulleys driven by said shaft; two driven pulleys; a driving shaft to which one of said driven pulleys is fixedly secured; means whereby and through which said driven pulleys may be operated each from the other, and in opposite directions; a pair of normally loose belts extending about said pairs of driving and driven pulleys; two belt tightening devices one associated with each of said belts and whereby either belt may be tightened independently of the other; two operating members one operatively associated with each of said belt tightening devices; a single manually operable member movable in two directions from a neutral central position and whereby said operating members may be operated each independently of the other; a driving wheel; and means whereby said driving wheel is driven from said driving shaft.

3. In a tractor of the class described, a suitable frame; an engine supported by said frame; a shaft driven by said engine; two driving pulleys driven by said shaft; two driven pulleys; a driving shaft to which one of said driven pulleys is fixedly secured; means whereby and through which said driven pulleys may be operated each from the other, and in opposite directions; a pair of normally loose belts extending about said pairs of driving and driven pulleys; two belt tightening devices one associated with each of said belts and whereby either belt may be tightened independently of the other; means operable by a single oscillating lever and adapted to operate either one of said belt tightening devices independently of the other to thereby bring about the driving of said driving shaft from either one of said oppositely rotating driven pulleys; a driving wheel; and means whereby said driving wheel is driven from said driving shaft.

4. In a tractor of the class described, a suitable frame; an engine supported by said frame; a shaft driven by said engine; two driving pulleys secured to said shaft and driven thereby; two driven pulleys; a driving shaft to which one of said driven pulleys is fixedly secured; a stationary bearing member having two bearings in one of which one end of said driving shaft is supported, while the other said bearing forms a support for a shaft to which the other of said driven pulleys is secured; two gears secured one to each of said shafts and which gears are in mesh with one another, and through which gears said driven pulleys may be driven each from the other and in opposite directions; a pair of normally loose belts extending about said pairs of driving and driven pulleys; two belt tightening devices one associated with each of said belts and whereby either belt may be tightened independently of the other; two oscillating operating members operatively connected one with each of said belt tightening devices; a single manually operable lever; means whereby said lever may be operatively connected with either one of said oscillating members to thereby operate each member independently of the other; a driving wheel; and means whereby said driving wheel is driven from said driving shaft.

5. In a tractor of the class described, a suitable frame; two driven pulleys; a driving shaft to which one of said driven pulleys is fixedly secured; a bearing carried by said frame and in which one end of said driving shaft is supported; a bearing member supported from said frame and having two bearings, one of which supports the other end of said driving shaft, and the other of which supports a shaft to which the other of said driven pulleys is secured; means connecting said two shafts and through which either one of them may drive the other; two belts in engagement one with each of said driven pulleys; and means through which the tractor is driven from said driving shaft.

6. In a tractor of the class described, a suitable frame; two driven pulleys; a driving shaft to which one of said driven pulleys is fixedly secured; a bearing carried by said frame and in which one end of said driving shaft is supported; a bearing member supported from said frame and having two bearings, one of which supports the other end of said driving shaft, and the other of which supports a shaft to which the other of said driven pulleys is secured; two gears secured one to each of said shafts and which gears are in mesh with one another and through which gears said pulleys may be driven each from the other and in opposite directions; two belts one in engagement with each of said pulleys; and means through which the tractor is driven from said driving shaft.

7. In a tractor of the class described, two normally loose belts; two belt tightening devices one associated with each of said belts and whereby either may be tightened independently of the other; two oscillating members operatively connected one with each of said belt tightening devices and each of which is provided with an arcuate slot; a single operating lever; a pin carried by said lever and movable along both of said slots; means for holding said lever in a neutral central position; and means for releasing said holding means so that said lever may be moved in either direction from a neutral central position.

8. In a tractor of the class described, two normally loose belts; two belt tightening devices one associated with each of said belts and whereby either may be tightened independently of the other; two oscillating members operatively connected one with each of said belt tightening devices and each of which is provided with an arcuate slot; a single operating lever; a pin carried by said lever and movable along both of said slots; means for holding said lever in a neutral central position; means for releasing said holding means; and a weight carried by said lever and adapted to move the same.

9. In a tractor of the class described, two normally loose belts; two belt tightening devices one associated with each of said belts and whereby either may be tightened independently of the other; two oscillating members operatively connected one with each of said belt tightening devices and each of which is provided with an arcuate slot; a single operating lever; a pin carried by said lever and movable along both of said slots; means for holding said lever in a neutral central position; means for releasing said holding means; a flexible member or line connected with said releasing means to thereby effect the operation of said releasing means; and a weight carried by said lever and adapted to move the same.

10. In a tractor of the class described, two normally loose belts; two belt tightening devices one associated with each of said belts and whereby either may be tightened independently of the other; two oscillating members operatively connected one with each of said belt tightening devices and each of which is provided with an arcuate slot; a single operating lever; a pin carried by said lever and movable along both of said slots; a lug formed in one of said slots; a bar carried by said lever and movable longitudinally thereof; a pin at one end of said bar and adapted to engage said lug; and a pivoted latch carried by said lever and operatively connected with the other end of said bar.

11. In a tractor of the class described, two normally loose belts; two belt tightening devices one associated with each of said belts and whereby either may be tightened independently of the other; two oscillating members operatively connected one with each of said belt tightening devices and each of which is provided with an arcuate slot; a single operating lever; a pin carried by said lever and movable along both of said slots; a lug formed in the side of the slot of one of said oscillating members; a bar carried by said lever and movable longitudinally thereof; a pin at one end of said bar and adapted to engage said lug; a weight secured to said bar; a pivoted latch member carried by said lever and operatively connected with said bar; and a flexible member connected with said latch to thereby operate the same and release said lever.

12. In a tractor of the class described, two normally loose belts; two belt tightening devices one associated with each of said belts and whereby either may be tightened independently of the other; two oscillating members operatively connected one with each of said belt tightening devices and each of which is provided with an arcuate slot; a single operating lever; a pin carried by said lever and movable along both said slots; a lug formed in the side of the slot of one of said oscillating members; a bar carried by said lever and movable longitudinally thereof; a pin at one end of said bar and adapted to engage said lug; a weight secured to said bar; a pivoted latch member carried by said lever and operatively connected with said bar; a fixed pulley; a flexible member extending about said pulley and the free end of which is connected with said latch; and a loop formed in said flexible member and adapted to engage said lever and hold it in a neutral central position.

13. In a tractor of the class described, a main power shaft; two driving pulleys carried by said shaft; two driven pulleys operable each from the other and in opposite directions; a driving shaft to which one of said pulleys is secured; two normally loose belts extending one about each pair of driving and driven pulleys; two pivotally supported belt tightening devices having each a pulley at its free end, and which pulleys are adapted to engage the belts aforesaid; a single pivotally supported belt tightener operating device movable into two extreme positions to thereby operate said belt tightening devices each independently of the other; means for holding said operating device in a neutral central position; and a flexible member operatively connected with said holding means and adapted to release the same to thereby bring about the operation of said belt tightening device.

14. In a tractor of the class described, a main power shaft; two driving pulleys carried by said shaft; a driving shaft; a driven pulley secured to said driving shaft; a second driven pulley; gearing between said two pulleys and through which said pulleys are caused to operate in opposite directions; two normally loose driving belts extending one about each pair of driving and driven pulleys; two pivotally supported belt tightening devices; two pulleys carried one by each of said belt tightening devices and adapted to engage the belts aforesaid; a lever whereby said belt tightening devices are operated; a weight carried by said lever and adapted to move the same in one direction; locking means adapted to hold said lever in a neutral central position; and a flexible operating member connected with said locking device and adapted to release the same to thereby permit said weight to move said lever.

15. In a tractor of the class described and in combination with two normally loose belts and belt tightening means therefor, a first pulley and a second pulley about which said belts respectively pass, a tractor driving shaft driven directly by the first pulley, a second shaft rotatable with the second pulley, a bracket projecting between said pulleys and supporting the end portion of the first named shaft and the mid-portion of the second shaft, and gears disposed between the bracket and the first pulley and housed in the latter for driving the first shaft from the second shaft in opposite direction; whereby the tractor may be driven forwardly or backwardly by said belts.

16. Tractor driving mechanism including a first pulley and a second pulley, belts for driving one or the other of said pulleys at will, a first shaft and a second shaft on which said pulleys are respectively mounted and with which they are constrained to turn, the ends of said pulleys being close together and overlapping a supporting bracket interposed between and projecting into said pulleys, and meshing gears carried by said shafts and housed by one of said pulleys between said housing pulley and the bracket.

In testimony whereof I affix my signature.

JOHN M. MEYERS.